United States Patent [19]

Rasquin

[11] 4,057,737

[45] Nov. 8, 1977

[54] VERY-HIGH-POWER-TRANSMISSION CABLE SYSTEM

[75] Inventor: Werner Rasquin, Cologne, Germany

[73] Assignee: Felten & Guilleaume Carlswerk AG, Cologne, Germany

[21] Appl. No.: 579,497

[22] Filed: May 21, 1975

Related U.S. Application Data

[63] Continuation of Ser. No. 382,713, July 26, 1973, abandoned.

[30] Foreign Application Priority Data

July 29, 1972 Germany ........................ 2237428

[51] Int. Cl.$^2$ ........................ H02B 7/30; H02B 11/02

[52] U.S. Cl. ........................ 307/147; 323/121

[58] Field of Search ........................ 323/102, 105, 121; 174/DIG. 6, 15 C, 15 BH; 307/147, 148

[56] References Cited

U.S. PATENT DOCUMENTS

| | | | |
|---|---|---|---|
| 2,173,717 | 9/1939 | Hobart | 307/147 |
| 3,522,361 | 7/1970 | Kafka | 174/15 C |
| 3,686,423 | 8/1972 | Doose et al. | 174/15 C |
| 3,764,726 | 10/1973 | Kohler | 174/15 BH |

*Primary Examiner*—David Smith, Jr.
*Attorney, Agent, or Firm*—Michael J. Striker

[57] ABSTRACT

A power-transmission system connects a source of electrical energy to an electrical load. The power-transmission system is comprised of a first cable system driven above its natural power and a second cable system connected in series with the first cable system and driven below its natural power.

7 Claims, 4 Drawing Figures

VERY-HIGH-POWER-TRANSMISSION CABLE SYSTEM

This is a continuation of application Ser. No. 382,713, filed July 26, 1973, now abandoned.

BACKGROUND OF THE INVENTION

The invention relates to a power current cable system for the transmission of energy at very high power, with the energy being furnished by a current generator connected at one end of the cable system and being delivered to a load connected at the other end of the cable system, with the load carrying an inductive current component.

Transmission lines, cables, overhead power lines, and the like, all have finite maximum transmission lengths. The maximum transmission length for a particular type of transmission cable depends firstly upon the type of transmission cable involved, upon the stability criteria of the current generator, the difference between the load voltage and the generator voltage, and also the difference between the load current and the generator current. With overhead or open-air transmission lines, the maximum transmission length can be determined from each of the foregoing criteria; however, with cable-type transmission systems the maximum transmission length is predominantly dependent upon one of the last-mentioned two factors.

Very-high-power cables, such as cryogenic cables, superconductive cables, and pressurized-gas ($SF_6$) cables as described for instance in Cryogenics (1969) pp. 165–176, IEEE Trans. PAS-89 (1970) pp. 1995–2003 and IEEE Trans. PAS-88 (1969) pp 369–375 respectively have relatively short maximum transmission lengths, and this greatly limits the usefulness and applicability of such cables. The limitation upon the transmission lengths of such cables derives from the fact that such cables are furnished, at their generator ends, with power in excess of their natural power. Natural power also known as natural load or natural loading is the power which a transmission cable is capable of furnishing to a matched load, i.e., a load having an impedance equal to the characteristic impedance of the transmission cable. For example, assume that a 110 kV cable has a characteristic impedance $Z_w$. If this cable is furnishing power to a matched load, i.e., a load having an impedance equal to $Z_w$, then the power which the cable is capable of furnishing to the load is evidently equal to $P_N = (110 \text{ kV})^2/Z_w$. When the power transmitted over the cable has such values, there is a very significant distributed inductive voltage drop along the length of the cable. The greater the length of the cable, the greater is the voltage discrepancy between the voltage at the load and generator ends of the cable. Since the load usually exhibits inductive reactance, the voltage at the generator side of the cable will always be greater than the voltage at the load side of the cable. The voltage furnished by the generator is customarily made greater than that actually required by the load, to take losses into account. However, there is a limit to the voltage which can be safely applied to the generator end of the cable, and accordingly the safe transmission length of the cable becomes limited by the need to avoid the transmission of higher power than the cable can handle.

It is already known to attempt to increase the maximum transmission lengths of heavy duty cable, such as oil-filled cables, by connecting to the cables various reactive electrical components, namely condensors and inductors. This prior-art technique has had some success when the transmission of medium to high power was involved. However, with the transmission of very high power, for example 800–900 MVA, it becomes practically impossible to assign to the compensating energy-storing components circuit values that will satisfactorily take into account the high loading (voltage spikes) to be dealt with, so that the use of this kind of cable is still limited as to the maximum transmission length practicable.

SUMMARY OF THE INVENTION

It is the general object of the present invention to overcome the aforedescribed disadvantages and limitations prevailing in the prior art.

It is a more particular object of the present invention to increse the maximum practicable transmission lengths of cable used to transmit energy at very high power, without the need for auxiliary energy-storing compensating components.

It is most particularly an object of the present invention to provide a new technique for the use of very-high-power cables, particularly cryogenic cables, superconductive cables, and pressurized-gas ($SF_6$) cables, such as to make these cables really practical and economical to use.

It is another object of the invention to provide a novel technique for using such very-high-power cables in cable systems which are capable of transmitting energy at high power with substantially no superimposed reactive power component.

These objects, and others which will become more understandable from the following description, can be met, according to the present invention by providing a power-transmission system for connecting a source of electrical energy to an electrical load. According to the invention, the power-transmission system is comprised of a first cable system driven above its natural power and a second cable system connected in series with the first cable system and driven below its respective natural power.

The invention contemplates the use of a first cable system driven above its natural power connected in series with a second cable system driven below its natural power, as just stated. As also stated above, natural power is the power which a cable system can transmit to a load having an impedance equal to the characteristic impedance of the cable system. The invention exploits the fact that when a cable is driven below its natural power, the current in the cable, aside from including a time-average effective component and also an inductive component, furthermore includes a capacitive component which increases with increasing cable length. The capacitive component of the cable current is vectorially added to the inductive current component and compensates or offsets such inductive current component more and more with increasing cable length. As the cable length is made still greater, the capacitive current component completely cancels the inductive current component, and with further increases of length the reactive component of the cable current becomes purely capacitive. Accordingly, if a cable driven below its natural power is connected to a cable which is driven above its respective natural power, the cable driven below its natural power acts like a capacitive compensating element for the cable driven above its natural power. The length of the cable driven above its natural power can be selected in dependence upon the magnitude of the capacitive component of the current flowing in the length of cable driven below its natural power. It accordingly becomes possible to combine cable lengths having different limiting parameters, and respectively driven above and below their respective natural powers, so as to result in a composite cable system having a maximum transmission length far greater than what could be achieved using the same materials but with cables driven exclusively below their natural power.

According to one advantageous concept of the invention, the cable system which is driven above its natural power comprises at least one cryogenic cable, or one superconductive cable, or one pressurized-gas ($SF_6$) cable. In fact, the advantageousness of the inventive concept becomes most apparent when the cable system driven above its natural power is of the ultra-modern very-high-power type, such as a cryogenic cable, connected in series with a group of parallel-connected conventional high-power cables, for example oil-filled cables or polyethylene high-voltage cables, because with such a combination of cables it becomes possible to greatly increase the length of the cable component driven above its natural power, and such increase may involve as much as a tripling of the maximum possible cable length of the cable component.

According to a further advantageous concept of the invention, the length of the cable system that is driven below its natural power can be so chosen that the total current flowing in this cable system is capacitive, while the length of the cable system which is connected thereto and which is driven above its respective natural power can be so selected that the total current flowing in this cable system is inductive, with the inductive current component in the latter cable system being equal to the capacitive current flowing in the cable system which is driven below its natural power. According to this advantageous concept, it is possible to achieve a complete compensation of the reactive power, so that the power furnished by the generator to the cable system can be exclusively real power, thereby achieving an optimal use of the available energy and maximum economy.

Thus, according to the invention it is possible to increase the maximum transmission lengths of high-power cables, and especially very-high-power cables, while simultaneously achieving an optimum transmission of energy by compensation of the reactive-power power component.

The novel features which are considered characteristic for the present invention are set forth in particular in the appended claims. The invention itself, however, both as to its construction and its method of operation, together with additional objects and advantages thereof, will best be understood from the following description of specific embodiments when read in connection with the accompanying drawing.

DESCRIPTION OF THE PREFERRED EMBODIMENT

Figure 1:
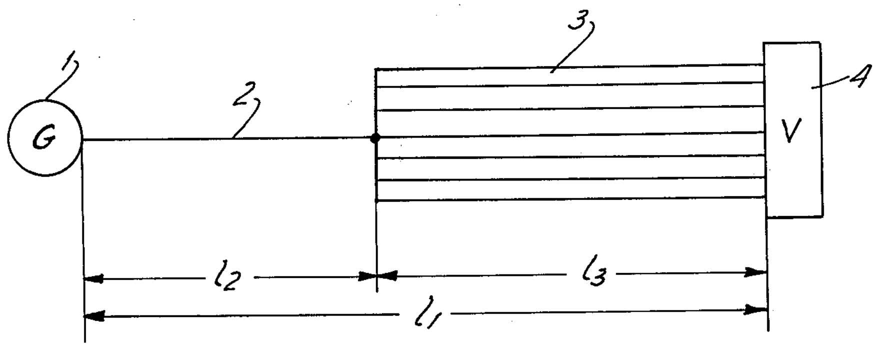
FIG. 1 illustrates in schematic manner a cable system according to the invention.

The illustrated cable system includes a current generator 1, for example a synchronous generator. Connected to current generator 1 is a high-power cable 2 driven above its natural power, for example a cryogenic cable, a superconductive cable or a pressurized-gas ($SF_6$) cable. Connected in series with the high-power cable 2 in a number of parallel-connected conventional oil-filled cables 3. In the drawing seven such oil-filled cables are connected in parallel to form the cable system which is driven under its natural power or natural loading. At the end of the cable system is connected a load 4. The current passing through the load 4 is comprised of an in-phase current component and also an inductive current component.

The following numerical example will make it clear that by connecting in series a cable system driven above its natural power or loading and a cable system driven below its respective natural power or loading, a significant increase results in the length of cable which can be used for the cable system being driven above its respective natural power or loading.

The load 4 is assumed to have a power of $S = 700$ MVA, a power factor of $\cos\theta = 0.966$ (inductive), and should be driven by a voltage of 110 kV.

Figure 2:
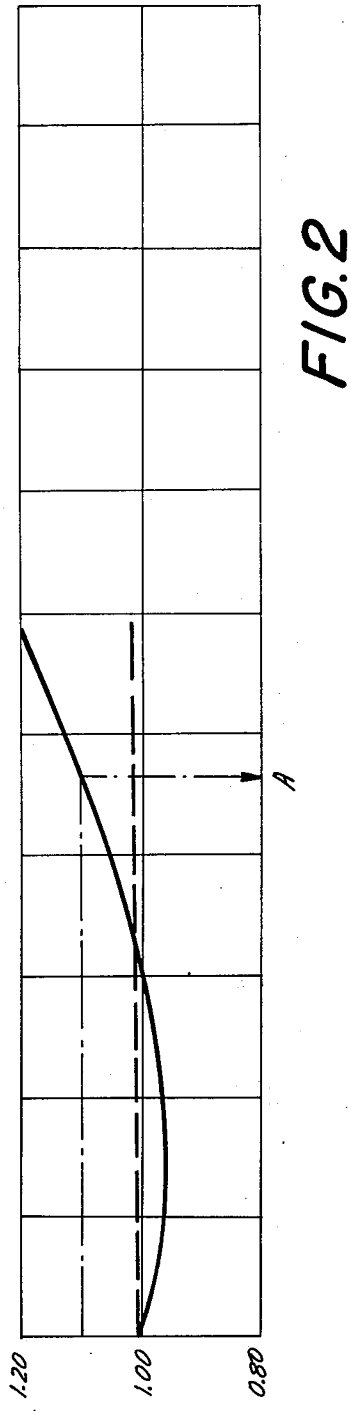
FIG. 2 illustrates the current versus length characteristic for a cable driven below its natural power.

The conventional cables 3 shown in FIG. 1 are 110 kV oil-filled cables, having a natural power or loading $P_{N3} = 350$ MW, a phase constant $\beta_3 = 0.0048$/km and a maximum power $S_{max3} = 110$ MVA. Each of these cables is limited by the requirement that $|I_{a3}/I_{e3}| = 1.1$, this equation representing the maximum permissible elevation of the current value at the beginning of the cable relative to that at the end of the cable, this maximum permissible ratio being determined by the maximum permissible heating of the cable. This basic requirement as to the maximum difference between the current at the beginning of the cable and the current at the end of the cable, establishes for the conventional high-power cables 3 a maximum transmission length of $l_3 = 46.5$ km. In FIG. 2 this value of the maximum transmission length is designated A. As can be seen from FIG. 2, the total current flowing in the cables 3 is initially inductive, but with increasing cable length the capacitive current component which also flows in the cables increases, and thereby compensates the inductive current component, unitl finally after completely cancelling the inductive current component the capacitive current component predominates, and the total cable current becomes capacitive.

Figure 3:
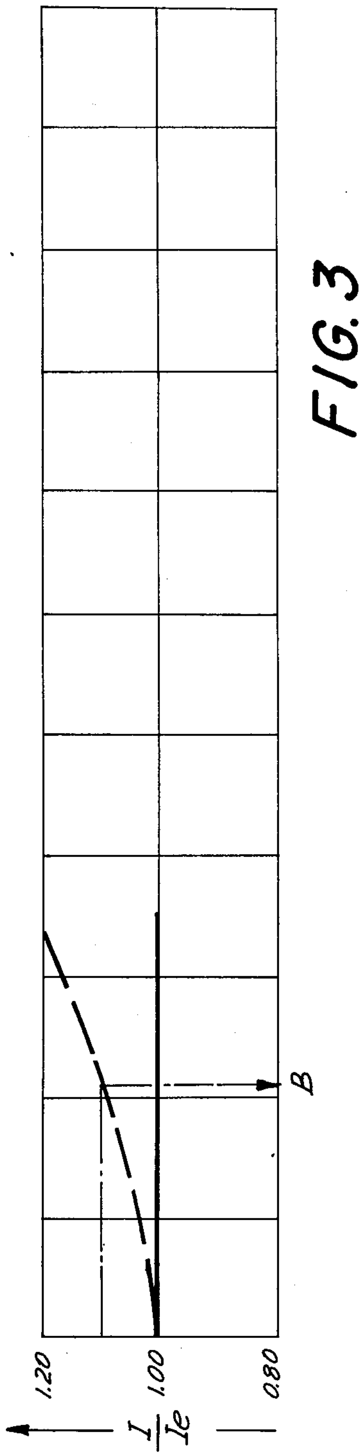
FIG. 3 illustrates the voltage versus length characteristics for a cable driven above its natural power.

In the illustrated example, the very-high-power cable 2 driven above its natural power is a 110 KV cryogenic cable having a natural power of $P_{N2} = 70$ MW, a phase constant $\beta_2 = 0.0013$/km and a maximum power $S_{max2} = \mathbf{820}$ MVA. FIG. 3 shows the variation in the voltage along the cable length $I_2$. As can be seen from this curve, the voltage at the beginning of the cable rises with increasing cable length; the limiting condition $|U_{a2}/U_{e2}| = 1.1$ makes for a maximum transmission length of the very-high-power cable 2 of $l_2 = 19.6$ km. This value is designated B on the curve.

Figure 4:
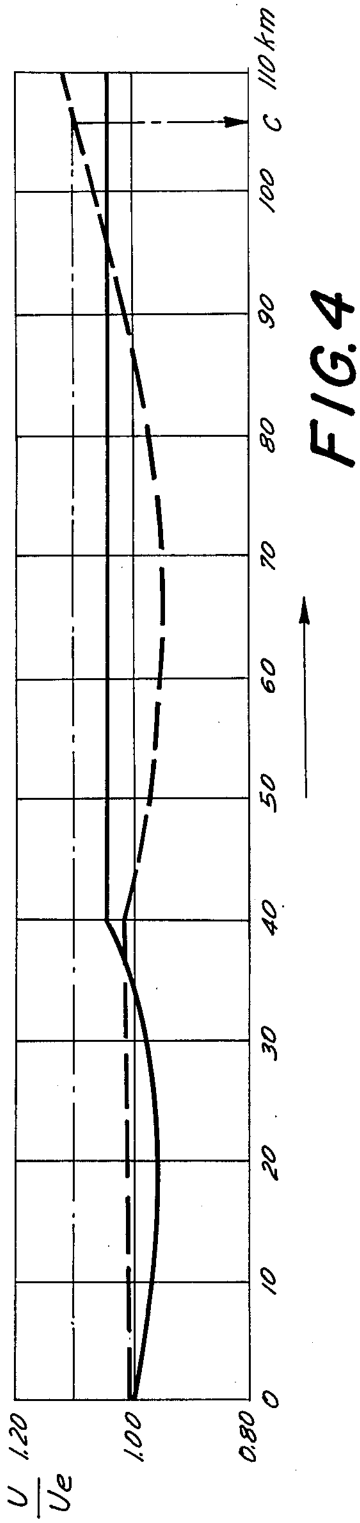
FIG. 4 illustrates the current versus length characteristics for a cable system like that shown in FIG. 1.

FIG. 4 shows the current versus cable-length characteristic for the combination of the very-high-power cable 2 driven over its natural power with the high-power cables 3 driven below their natural power. The length of the cables 3 which are driven below their natural power must be lower than the previously calculated length of $l_3 = 46.5$ km. A length of $l_3 = 40$ km is selected. In consequence, at the beginning of these cables 3 $|I_{a3}/I_{e3}| = 1.05$ and $|U_{a3}/U_{e3}| = 1.022$. The requirement that the voltage $U_{a2}$ at the beginning of the very-high-power cable 2, which is driven above its natural power, must not be greater than $1.1\ U_{e2}$, makes for a cable length for cable 2 of $l_2 = 62.5$ km. Since all the other limiting criteria are met, there results a total length of $l_1 = 40\text{ km} + 62.5\text{ km} = 102.5$ km for the combined cable system of the invention shown in FIG. 1 (see FIG. 4). This value is designated C.

By suitably selecting the lengths $l_3$ and $l_2$ it is possible to achieve a complete compensation of reactive power. To achieve this, the length $l_3$ of the cables 3 driven under their natural power should be so chosen that the total current in these cables is capacitive. Similarly, the length $l_2$ of the very-high-power cable 2 driven above its natural power should be so chosen that the total current in this cable is inductive and equal to the capacitive current component of the total current flowing in the cables 3. The relationship between the length $l_2$ of the very-high-power cable 2 which is driven above its natural power and the length of the cables 3 driven below their natural power is given by the following equation:

$$l_2 = \frac{1}{\beta_2} \cdot \frac{P_{N2}}{|s|} \cdot \frac{\beta_3 l_3 \cdot \left[\frac{P_{N3}}{|s|} - \frac{|s|}{P_{N3}}\right] - \sin\theta}{1 - 2\beta_3 l_3 \left[\frac{P_{N3}}{|s|} - \frac{|s|}{P_{N3}}\right]\sin\theta + \beta_3^2 l_3^2 \left[\frac{P_{N3}}{|s|} - \frac{|s|}{P_{N3}}\right]^2 - \left[\frac{P_{N2}}{|s|}\right]^2}$$

In the above equation, the terms have the following meanings:

$\beta_2$ = phase constant of the very-high-power cable 2
$\beta_3$ = phase constant of conventional high-power cable 3
$P_{N2}$ = natural power of very-high-power cable 2
$P_{N3}$ = natural power of high-power conventional cable 3
$|S|$ = load apparent power
$\theta$ = phase shift of load 4
$l_2$ = length of very-high-power cable 2
$l_3$ = length of high-power cable 3

In arriving at the above relationship, it has been assumed that the damping constant is negligible compared to the phase constant.

If different lengths are employed for the cables 3, which are driven under their natural power, then the lengths for the cable 2, which is driven above its natural power, can be calculated using the equation presented above, in order to achieve complete compensation of the reactive-power power component for the entire high-current cable system (see the following table).

| $l_3$ (km) | $l_2$ (km) | $l_1 = l_2 + l_3$ (km) |
|---|---|---|
| 14.4 | 0.0 | 14.4 |
| 15.0 | 2.44 | 17.44 |
| 20.0 | 22.00 | 42.00 |
| 25.0 | 41.20 | 66.20 |
| 30.0 | 57.00 | 87.00 |

The calculated values for the length of the cable 2, which is driven above its natural power, show that in addition to the aforementioned compensation of the reactive-power power component, a marked increase in the length of the cable $l_2$ becomes possible.

It will be understood that each of the elements described above, or two or more together, may also find useful appliations in other types of constructions differing from the types of constructions described above.

While the invention has been illustrated and described with reference to a high-power cable system, it is not to be considered limited to the details shown, since various modifications and structural changes can be made without departing in any way from the spirit and concept of the present invention.

Without further analysis, the foregoing will so fully reveal the gist of the present invention that others can by applying current knowledge readily adapt it for various purposes without omitting features that from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

I claim:

1. In combination, an electrical load having load terminals across which predetermined voltage is to be applied; an A.C. power source located remote from said electrical load; and a long-distance power-transmission cable system comprising a first cable system and a second cable system connected in series with each other and connecting said source to said load and operative for transmitting a predetermined power from said source to said load, said second cable system having a natural loading greater than the power which it is transmitting and accordingly having a capacitive character so that its current increases in direction from its load end to its source end whereas its voltage remains approximately constant along its length, said first cable system having a natural loading lower than the power which it is transmitting and accordingly having an inductive character so that its voltage increases in direction from its load end to its source end whereas its current remains approximately unchanged along its length, whereby at the source end of the series combination of said first and second cable system the voltage is lower than if both cable systems had a natural loading lower than the transmitted power and the current is lower than if both cable systems had a natural loading greater than the transmitted power.

2. The combination defined in claim 1, wherein said first cable system is comprised of at least one cryogenic cable transmitting power greater than its natural loading.

3. The combination defined in claim 1, wherein said first cable system is comprised of at least one superconductive cable transmitting power greater than its natural loading.

4. The combination defined in claim 1, wherein said first cable system is comprised of at least one pressurized-gas cable.

5. The combination defined in claim 4, wherein said pressurized-gas cable is an $SF_6$ pressurized-gas cable.

6. The combination defined in claim 1, wherein the length of said first cable system and the length of said second cable system are such that the current flowing in said second cable system is capacitive and the current flowing in said first cable system is inductive and is equal to the capacitive current flowing in said second cable system.

7. In combination, an electrical load having load terminals across which predetermined voltage is to be applied; an A.C. power source located remote from said electrical load; and a long-distance power-transmission cable system comprising a first cable system and a second cable system connected in series with each other and connecting said source to said load and operative for transmitting a predetermined power from said source to said load, said first cable system being connected imtermediate said source and said second cable system, said second cable system being connected intermediate said first cable system and said load, said second cable system having a natural loading greater than the power which it is transmitting and accordingly having a capacitive character so that its current increases in direction from its load end to its source end whereas its voltage remains approximately constant along its length, said first cable system having a natural loading lower than the power which it is transmitting and accordingly having an inductive character so that its voltage increases in direction from its load end to its source end whereas its current remains approximately unchanged along its length, whereby at the source end of the series combination of said first and second cable systems the voltage is lower than if both cable systems had a natural loading lower than the transmitted power and the current is lower than if both cable systems had a natural loading greater than the transmitted power.

* * * * *